(12) United States Patent
Snead (10) Patent No.: US 10,598,135 B2
(45) Date of Patent: Mar. 24, 2020

(54) IN-LINE FUEL COOLING SYSTEM AND METHOD FOR A MOTOR VEHICLE

(71) Applicant: Walter L. Snead, Columbus, OH (US)

(72) Inventor: Walter L. Snead, Columbus, OH (US)

(*) Notice: Subject to any disclaimer, the term of this patent is extended or adjusted under 35 U.S.C. 154(b) by 0 days.

(21) Appl. No.: 15/671,264

(22) Filed: Aug. 8, 2017

(65) Prior Publication Data

US 2018/0073473 A1    Mar. 15, 2018

Related U.S. Application Data

(60) Provisional application No. 62/530,969, filed on Jul. 11, 2017, provisional application No. 62/393,432, filed on Sep. 12, 2016.

(51) Int. Cl.

| F02M 31/20 | (2006.01) |
|---|---|
| F02M 33/08 | (2006.01) |
| F25B 1/00 | (2006.01) |
| F25B 21/02 | (2006.01) |

(52) U.S. Cl.
CPC ............ *F02M 31/20* (2013.01); *F02M 33/08* (2013.01); *F25B 1/00* (2013.01); *F25B 21/02* (2013.01); *Y02T 10/126* (2013.01); *Y02T 10/166* (2013.01)

(58) Field of Classification Search
CPC ........ F02M 33/08; F02M 31/20; F02B 27/04; F25B 1/00; F25B 21/02
USPC ...................................................... 123/541
See application file for complete search history.

(56) References Cited

U.S. PATENT DOCUMENTS

| 5,964,206 | A | 10/1999 | White et al. | |
|---|---|---|---|---|
| 6,182,435 | B1* | 2/2001 | Niggemann | B64D 41/00 60/266 |
| 6,948,331 | B1* | 9/2005 | Ho | B64D 13/06 62/401 |
| 7,367,292 | B2 | 5/2008 | Vath | |
| 7,659,183 | B2 | 2/2010 | Johnson | |
| 8,006,675 | B2 | 8/2011 | Chyo et al. | |
| 8,096,287 | B2 | 1/2012 | Rasmussen | |
| 9,261,056 | B2* | 2/2016 | Burke | F02B 29/0443 |
| 9,341,153 | B2 | 5/2016 | Ibrahim et al. | |
| 2003/0217738 | A1* | 11/2003 | Ryon | F02M 31/20 123/541 |
| 2007/0006853 | A1* | 1/2007 | Fults | F02B 27/04 123/540 |
| 2009/0002948 | A1* | 1/2009 | Jarlestal | B64D 13/00 361/701 |

* cited by examiner

*Primary Examiner* — Syed O Hasan
(74) *Attorney, Agent, or Firm* — Porter, Wright, Morris & Arthur, LLP (57) ABSTRACT

An onboard, in-line fuel cooling system for a motor vehicle includes a chiller adapted to be powered by an onboard direct-current electric power source such as, for example, a motor vehicle power system or an auxiliary battery, and a fuel conduit adapted to form at least a portion of a fuel supply line between an onboard fuel tank and an onboard engine of the motor vehicle. The fuel conduit is in thermal communication with the chiller to cool fuel passing through the fuel conduit from the onboard fuel tank to the onboard engine. Thus, the engine is provided with fuel at a temperature lower than the temperature of the fuel in the fuel tank. The chiller can be a vapor-compression refrigeration system, a thermo-electric cooler, or any other suitable type of chiller powered by the onboard direct-current electric power source.

20 Claims, 6 Drawing Sheets

IN-LINE FUEL COOLING SYSTEM AND METHOD FOR A MOTOR VEHICLE

CROSS-REFERENCE TO RELATED APPLICATIONS

This application claims the priority benefit of U.S. provisional patent application No. 62/530,969 filed on Jul. 11, 2017, and U.S. provisional patent application No. 62/393,432 filed on Sep. 12, 2016, the disclosures of which are each expressly incorporated herein in their entireties by reference.

STATEMENT REGARDING FEDERALLY SPONSORED RESEARCH

Not Applicable

PARTIES TO A JOINT RESEARCH AGREEMENT

Not Applicable

REFERENCE TO APPENDIX

Not Applicable

FIELD OF THE INVENTION

The field of the present invention generally relates to fuel systems for motor vehicles and, more particularly, to cooling systems for cooling fuel in motor vehicle fuel systems.

BACKGROUND OF THE INVENTION

Many components of a motor vehicle, such as a car or truck, generate heat that can be detrimental to the performance of the motor vehicle. Many of these heat-generating components are located under an engine-compartment hood such as, for example, high-pressure fuel pumps, headers, exhaust manifolds, and the like where they all combine to raise the temperature of fuel, about to be delivered to the engine, above ambient temperature. As the fuel is heated, it becomes less dense which results in less efficient burning of the fuel. Consequently, the motor vehicle generates less power and lower fuel efficiency. If heated enough, the fuel can create a potentially lean condition or "vapor lock" that can damage the motor vehicle engine.

The reverse is true as well. As the fuel is cooled below ambient temperature, the fuel becomes denser which results in more efficient burning of the fuel. Consequently, the motor vehicle generates more power and greater fuel efficiency and also reduces the chance of engine damage due to vapor lock. As a result, attempts have been made to cool the fuel of motor vehicles in order to obtain an increase in horsepower.

During the 1970's, Roger Penske's racing team on the Trans Am circuit is believed to have cooled fuel supplies to a below ambient temperature. Fuel was cooled in storage tanks in the pits of the race track during races. When the cooled fuel was delivered from the storage tanks to the on-board fuel tanks of the race cars during races, the cooled fuel delivered a horsepower edge and also required less space for the same weight of fuel onboard the cars because cooler fuel has a higher density. Fuel consumption is based on weight of fuel rather than volume of fuel so the cooled fuel effectively provided an increase in fuel tank capacity which gave the team greater flexibility in strategy related to pit stops at some race tracks. This approach was very effective for the Trans Am circuit. However, once the cooled fuel is pumped into the vehicle fuel tank, the cooled fuel must be quickly used before its temperature rises within the fuel tank or the effect of cooling the fuel is lost. This approach also requires relatively expensive cooling equipment for large volumes of fuel located in the storage tanks. Such cooling equipment may be too expensive and/or impractical in many situations.

Fuel cooling cans have been developed for in-line cooling of fuel between the on-board fuel tank and engine of a motor vehicle. For example, see the Mr. Gasket 1350 Cool Can manufactured by the Mr. Gasket Co. of Cleveland, Ohio and the Moroso 65125 Super Cool Can manufactured by Moroso Performance Products of Guilford, Conn. These cooling cans are located onboard the vehicle and include a container for holding ice or dry ice etc. The fuel supply line passing from the vehicle fuel tank to the engine extends through and/or about the container holding the ice to cool the fuel after leaving the vehicle fuel tank and before reaching the engine. While these cooling cans may effectively cool the fuel, they are limited in the degree to which the fuel is cooled and the length of time that fuel is cooled before the ice melts and needs replaced.

Accordingly, there is a need for improved on-board cooling systems and methods for cooling fuel in motor vehicle fuel systems.

SUMMARY OF THE INVENTION

Disclosed are fuel cooling systems and methods for motor vehicles which address one or more issues of the related art discussed above. Disclosed is an onboard fuel cooling system comprising, in combination, a chiller adapted to be powered by an onboard direct-current electric power source, and a fuel conduit adapted to form a portion of a fuel supply line between an onboard fuel tank and an onboard engine of the motor vehicle and in thermal communication with the chiller to cool the fuel passing through the fuel conduit from the onboard fuel tank to the onboard engine.

Also disclosed is motor vehicle comprising, in combination, an onboard fuel tank for storing a liquid fuel, an onboard engine powered by the liquid fuel, a fuel supply line for passage of the liquid fuel at least partially from the onboard fuel tank to the onboard engine, an onboard direct-current electric power source, and an onboard fuel cooling system. The onboard fuel cooling system comprises a chiller powered by the onboard direct-current electric power source, and a fuel conduit forming at least a portion of the fuel supply line between the onboard fuel tank and the onboard engine and in thermal communication with the chiller to cool the fuel passing through the fuel conduit from the onboard fuel tank to the onboard engine.

Also disclosed is a method for cooling fuel onboard a motor vehicle having a fuel supply line for passage of fuel at least partially from an onboard fuel tank for storing the fuel to an onboard engine powered by the fuel. The method comprises the steps of passing the fuel through a fuel conduit adapted to form at least a portion of the fuel supply line between the onboard fuel tank and the onboard engine, cooling the fuel passing through the fuel conduit from the onboard fuel tank to the onboard engine with an onboard chiller in thermal communication with the fuel conduit, and powering the onboard chiller with an onboard direct-current electric power source.

From the foregoing disclosure and the following more detailed description of various preferred embodiments it will be apparent to those skilled in the art that the present invention provides a significant advance in the technology and art of fuel cooling systems for motor vehicles. Particularly significant in this regard is the potential the invention affords for providing a relatively lightweight, compact, and inexpensive fuel cooling systems which can greatly increase both the degree of cooling of the fuel and the length of that time that cooled fuel is available for use by the motor vehicle engine. Additional features and advantages of various preferred embodiments will be better understood in view of the detailed description provided below.

BRIEF DESCRIPTION OF THE DRAWINGS

These and further features of the present invention will be apparent with reference to the following description and drawings.

It should be understood that the appended drawings are not necessarily to scale, presenting a somewhat simplified representation of various preferred features illustrative of the basic principles of the invention. The specific design features of the fuel cooling systems as disclosed herein, including, for example, specific dimensions, orientations, locations, and shapes of the various components, will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the fuel cooling systems illustrated in the drawings.

DETAILED DESCRIPTION OF CERTAIN PREFERRED EMBODIMENTS

It will be apparent to those skilled in the art, that is, to those who have knowledge or experience in this area of technology, that many uses and design variations are possible for the fuel cooling systems disclosed herein. The following detailed discussion of various alternative and preferred embodiments will illustrate the general principles of the invention in a motor vehicle application. However, other embodiments suitable for other applications will be apparent to those skilled in the art given the benefit of this disclosure.

Figure 1:
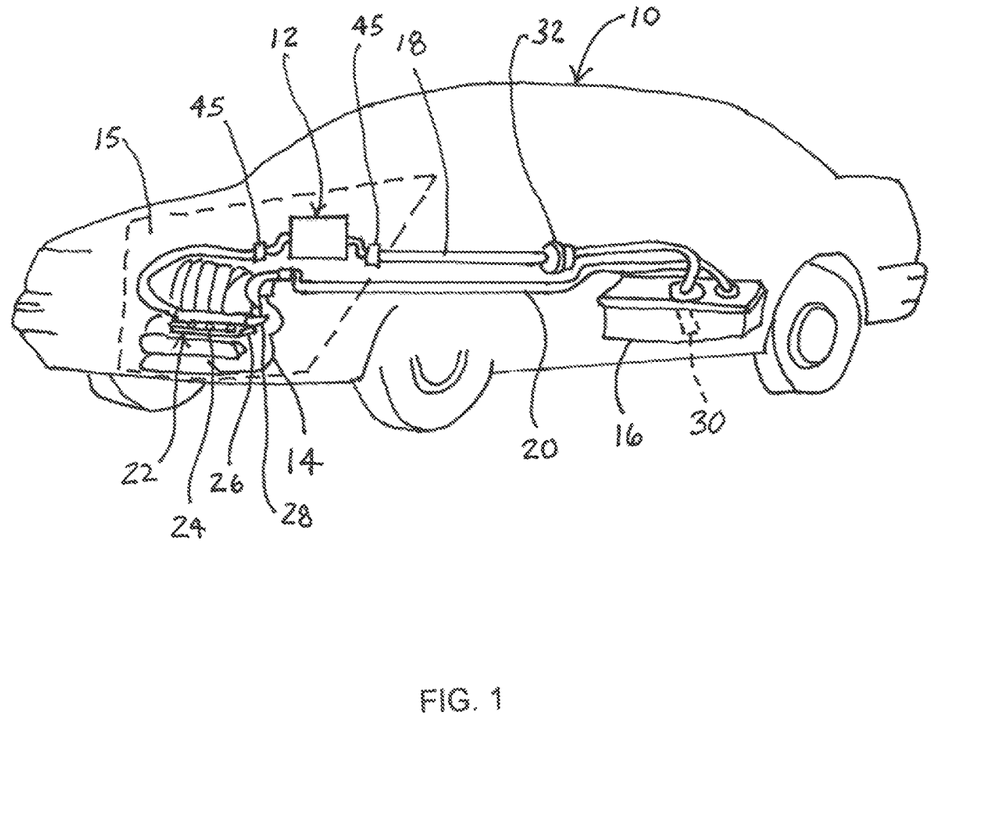
FIG. 1 is a diagrammatic view of a motor vehicle having a fuel cooling system according to the present invention.
Figure 1A:
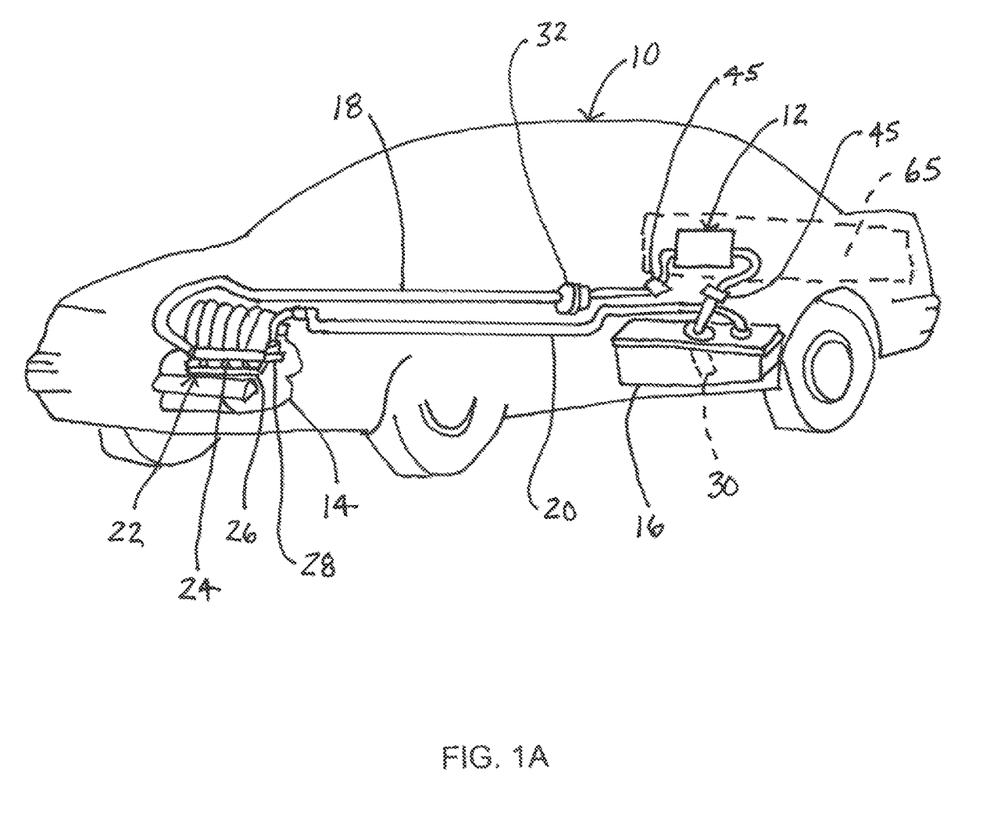
FIG. 1A is a diagrammatic view of the motor vehicle having the fuel cooling system of FIG. 1 in an alternative location according to a variation of the present invention.

Referring now to the drawings, FIG. 1 shows a motor vehicle 10 with an in-line, on-board fuel cooling system 12 according to the present invention. The illustrated motor vehicle 10 is a car but can alternatively be any other suitable type of motor vehicle such as, for example, buses, motorcycles, all-terrain vehicles, off-road vehicles, off-highway vehicles, light trucks (including vans, pickups, sport utility vehicles, and the like), regular trucks, and the like. The illustrated motor vehicle 10 includes an onboard internal-combustion engine 14, an onboard fuel tank 16 for storing a liquid fuel for powering the engine 14, an onboard fuel supply line 18 for passage of the liquid fuel from the fuel tank 16 to the engine 14, and an onboard fuel return line 20 for return passage of excess fuel from the engine 14 to the fuel tank 16. The illustrated fuel can be of any suitable type compatible for use by the engine 14 such as, for example, leaded or unleaded gasoline, methanol, ethanol, nitromethane, diesel, and the like. The illustrated fuel cooling system 12 is located in the engine compartment 15 so that fuel passing through the fuel supply line 18 is cooled by the fuel cooling system 12 near the engine 14 to minimize warming of the fuel between the fuel cooling system 12 and the engine 14. It is noted, however, the fuel cooling system can be located anywhere along the fuel supply line 18 between the fuel tank 16 and the engine 14. For example, the fuel cooling system 12 can alternatively be located in the trunk compartment 65 near the fuel tank 16 (as best shown in FIG. 1A).

The illustrated internal combustion engine 14 is configured to generate mechanical power by combustion of the fuel with an oxidizer such as air. It is noted that any other suitable type of engine 14 can alternatively be utilized. The illustrated engine 14 includes a fuel delivery system 22 having a plurality of fuel injectors 24 along a fuel rail 26 provided with a fuel pressure regulator 28. It is noted that any other suitable type of fuel delivery system 22 can alternatively be utilized such as, for example, a carburetor and the like.

The illustrated fuel tank 16 is provided with an electric fuel pump 30 which "pushes" the fuel from the fuel tank 16 to the fuel rail 26 of the fuel delivery system 22 via the fuel supply line 18. The illustrated fuel pump 30 is an internal or in-tank fuel pump but it is noted that an external fuel pump can alternatively or additionally be utilized such as an external fuel tank upstream or downstream of the fuel cooling system 12. The illustrated fuel supply line 18 is provided with an in-line fuel filter 32 adapted to screen out dirt and rust particles from the fuel before the fuel reaches the fuel delivery system 22. The illustrated fuel return line 20 is configured to return excess fuel from the pressure regulator 28 of the fuel delivery system 22 to the fuel tank 16 to maintain a desired pressure in the fuel rail 26. It is noted that the fuel return line 20 can alternatively have any other suitable configuration or can alternatively be eliminated in a returnless-type system.

Figure 2:
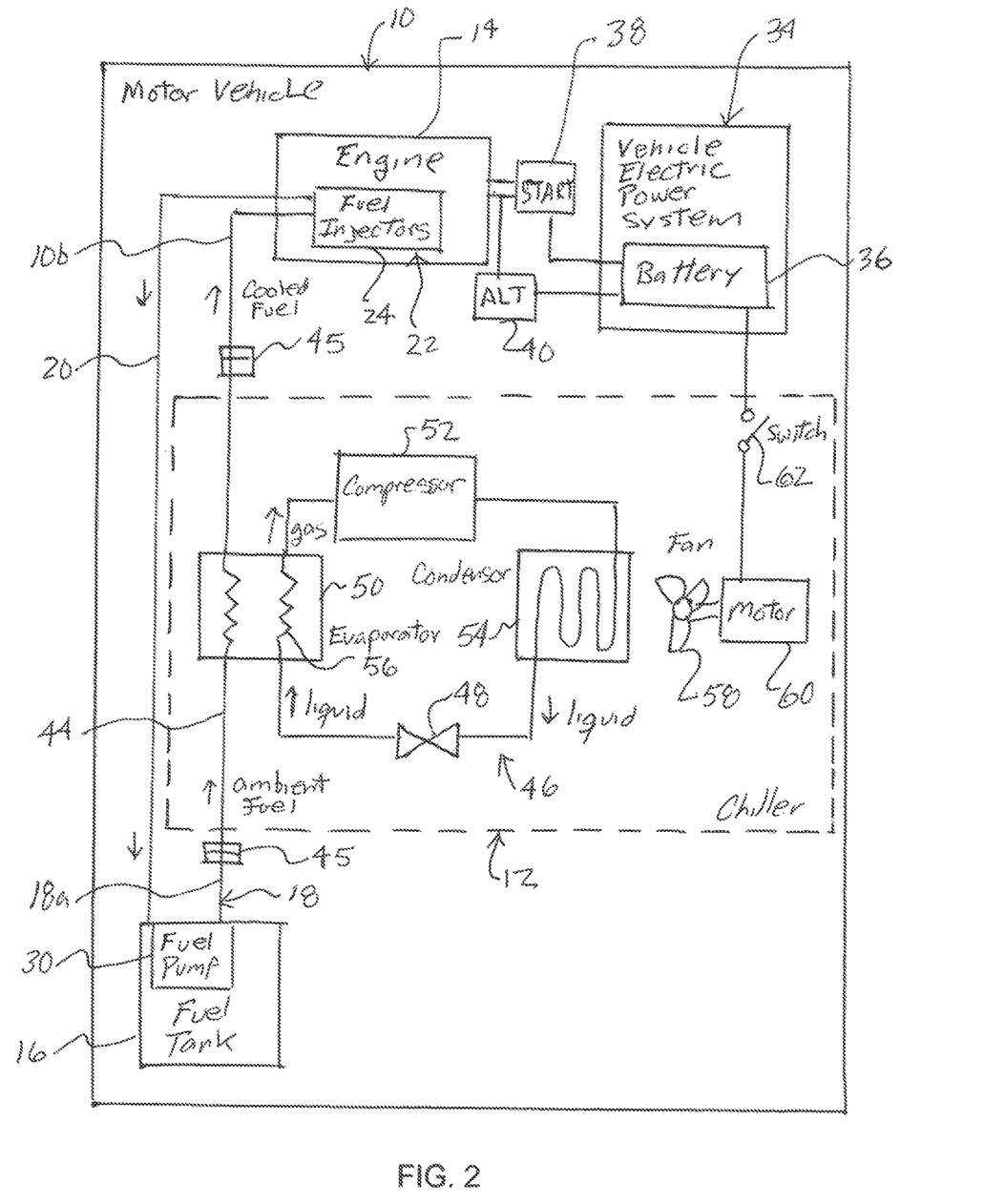
FIG. 2 is a schematic view of the fuel cooling system of FIG. 1 according to a first embodiment of the present invention, wherein the fuel cooling system includes a chiller or heat pump in the form of a DC-powered mechanical refrigeration system.

As best seen in FIG. 2, the illustrated motor vehicle 10 also includes an onboard vehicle electric power system 34 for providing electric components of the motor vehicle 10 with electric power such as, for example the ignition system, the fuel system, the lighting system, etc. The illustrated vehicle electric power system 34 includes a rechargeable battery 36 that provides direct current (DC) electric energy, a starter motor 38 which is powered by the battery 36 for starting the engine 14, and an alternator 40 driven by the engine 14 which maintains charge in the the battery 36 when the engine 14 is running. The illustrated vehicle electric power system 34 nominally provides 12 volts DC but any other suitable amount can alternatively be utilized such as, for example, 14, 16, 18 and the like volts DC.

The illustrated fuel cooling system 12 includes a chiller or heat pump 42 powered by the DC battery 36 of the vehicle electric power system 34 or other suitable DC power source, and a fuel conduit or coil 44 forming a portion of the fuel supply line 18 between the fuel tank 16 and the engine 14 and in thermal communication with the chiller 42 to cool the fuel passing through the fuel conduit 44 to a desired temperature below ambient temperature. The fuel conduit 44 can be integral with the fuel supply line 18 or removably mounted therein with suitable connections 45. It is noted that the illustrated motor vehicle 10 does not have an air-conditioning system for cooling air within the motor vehicle cabin. It is also noted that if the fuel cooling system 12 of the present invention is utilized in a motor vehicle having such an air-conditioning system, the fuel cooling system 12 has a chiller or heat pump 42 that is separate and distinct from the air-conditioning system used to cool the cabin air. It is further noted that the fuel cooling system 12 of the present invention is separate and distinct from a water-cooled cooling system that utilizes water, antifreeze, and/or a combination thereof to cool the engine block and the cylinder head of the motor vehicle engine. Such a water-cooled cooling system typically has a pump (driven by a pulley and belt from the engine crankshaft) that drives hot liquid out of the engine to an air-cooled radiator (where heat is passed from the radiator to an air stream passing over the radiator) and cooled liquid back to the engine.

The illustrated chiller or heat pump 42 is a mechanical refrigeration system in the form of a vapor-compression refrigeration system 46 but any other suitable type of mechanical refrigeration system can alternatively be used and any other suitable type of chiller or heat pump 42 can alternatively be utilized. The illustrated vapor-compression refrigeration system 46 utilizes a refrigerant for the removal of unwanted heat. The refrigerant is a chemical compound that is alternately compressed and condensed into a liquid and then permitted to expand into a vapor or gas as it is pumped through the closed system in order to remove heat from the fuel passing through the fuel supply line 18 to the engine 14 as described in more detail below.

The illustrated vapor-compression refrigeration system 46 includes a metering device 48, an evaporator or cooling coil 50, a compressor 52, and a condenser 54. The metering device 48 can be a thermal expansion valve, capillary tube, or any other device that suitably controls flow of refrigerant into the evaporator 50. The metering device 48 delivers the refrigerant through a refrigerant line to the refrigerant inlet of the evaporator 50 in liquid form at low pressure and low temperature.

The refrigerant enters the evaporator refrigerant inlet and passes through the evaporator 50 through a refrigerant conduit or coil 56 that is in thermal transfer relation with the fuel conduit or coil 44 connected within the fuel supply line 18 for passage of the fuel therethrough from the fuel tank 16 to the engine 14. The inlet and outlet of the fuel conduit 44 are adapted for connection to first and second portions 18a, 18b of the fuel supply line 18 respectively. The refrigerant expands and evaporates as it passes through the evaporator 50 to remove heat from the fuel to lower the temperature of the fuel. Heat travels from the warmer substance (the fuel) to the colder substance (the refrigerant) within the evaporator causing the refrigerant to evaporate into a vapor. The illustrated evaporator 50 is a liquid to liquid heat exchanger that cools the liquid fuel with the liquid refrigerant but can alternatively be of any suitable type of heat exchanger. It is noted that the liquid to liquid heat exchanger can be of any suitable type.

The low pressure, low temperature refrigerant vapor exits the evaporator 50 through a refrigerant outlet and is pulled through a refrigerant suction line connecting the refrigerant outlet of the evaporator 50 with a refrigerant inlet of the compressor 52. The compressor 52 compresses the low pressure, low temperature refrigerant vapor into a high temperature, high pressure vapor. The illustrated compressor 52 is a DC powered compressor and is suitably connected to the vehicle electric power system 34 but alternatively can be connected to any other suitable direct-current electric power source. Note that the compressor 52 is not mechanically driven by the engine 14 which would reduce available horsepower for powering the motor vehicle 10. The compressor 52 can be of any suitable type of electrically powered compressor.

The high pressure, high temperature refrigerant vapor exiting the compressor 52 is pushed through a discharge line connecting the outlet of the compressor 52 with an inlet of the condenser 54. The illustrated condenser 54 is an air-cooled condenser but any other suitable type of condenser 54 such as, for example, a water-cooled condenser or the like can alternatively be utilized. The illustrated condenser 54 is provided with a fan or blower 58 which blows air over cooling fins of the condenser 54. The fan or blower 58 can be driven by an electric motor 60 electrically powered by the vehicle electric power system 34 or other onboard direct current power source, or mechanically powered by the vehicle engine 14 or the like. Within the condenser 54, the high pressure, high temperature refrigerant vapor gives up the heat gained in the evaporator 50 to the cooler air flowing over the condenser 54. As heat is removed from the refrigerant vapor within the condenser 54, the refrigerant vapor is condensed back into a high pressure, high temperature refrigerant liquid. The condenser 54 can be of any suitable type.

The high pressure, high temperature refrigerant liquid exiting an outlet of the condenser 54 is pushed through a liquid line into an inlet of the metering device 48. Within the metering device 48, the high pressure, high temperature refrigerant liquid passes through a small opening or orifice where a drop in pressure and temperature occurs. The low pressure, low temperature refrigerant liquid passes into the relatively larger refrigerant inlet of the evaporator 50 where it expands and vaporizes to start another cycle through the closed system. While the illustrated metering device 48 can be connected to the evaporator 50 with a liquid line, it is noted that the metering device 48 can alternatively be incorporated directly into the evaporator 50.

During operation of the illustrated motor vehicle 10, the fuel pump 30 pushes fuel through the first portion 18a of the fuel supply line 18 from the fuel tank 16 to the inlet of the fuel conduit 44 within the evaporator 50. The fuel in the fuel tank 16 will initially be at or near ambient temperature. That is, the temperature of the air surrounding the fuel tank 16. However, if warm or heated fuel is returned to the fuel tank 16 from the fuel delivery system 22 through the fuel return line 20 during operation of the motor vehicle, the temperature of the fuel within the fuel tank 16 may rise above ambient temperature. Within the evaporator 50, heat is transferred from the fuel passing through the fuel conduit 44 to the colder refrigerant vapor passing through the refrigerant conduit 56 within the evaporator 50 that is in heat transfer relationship with the fuel conduit 44. Thus, the fuel is cooled to a lower temperature as it passes through the fuel conduit 44. The cooled fuel is pushed out of the outlet of the fuel conduit 44 within the evaporator 50 and passes to the engine fuel distribution system 22 through the second portion 18b of the fuel supply line for operation of the engine 14. Thus, the engine 14 is provided with fuel having a temperature lower than the temperature of the fuel located in the fuel tank 16. The illustrated fuel cooling system 12 is provided with an electric switch 62 to selectively connect and disconnect the compressor 52 with the vehicle electrical power system 34 to activate and deactivate the fuel cooling system 12. The switch 62 can be a manual switch for manual activation by an operator of the motor vehicle 10 or can be an automatic switch which automatically activates the fuel cooling system 12 based on a predetermined condition or conditions of the motor vehicle 10 such as, for example, the engine 14 operating, the fuel pump 30 operating, and/or the like. It is noted that the switch 20 can be eliminated if desired.

Figure 3:
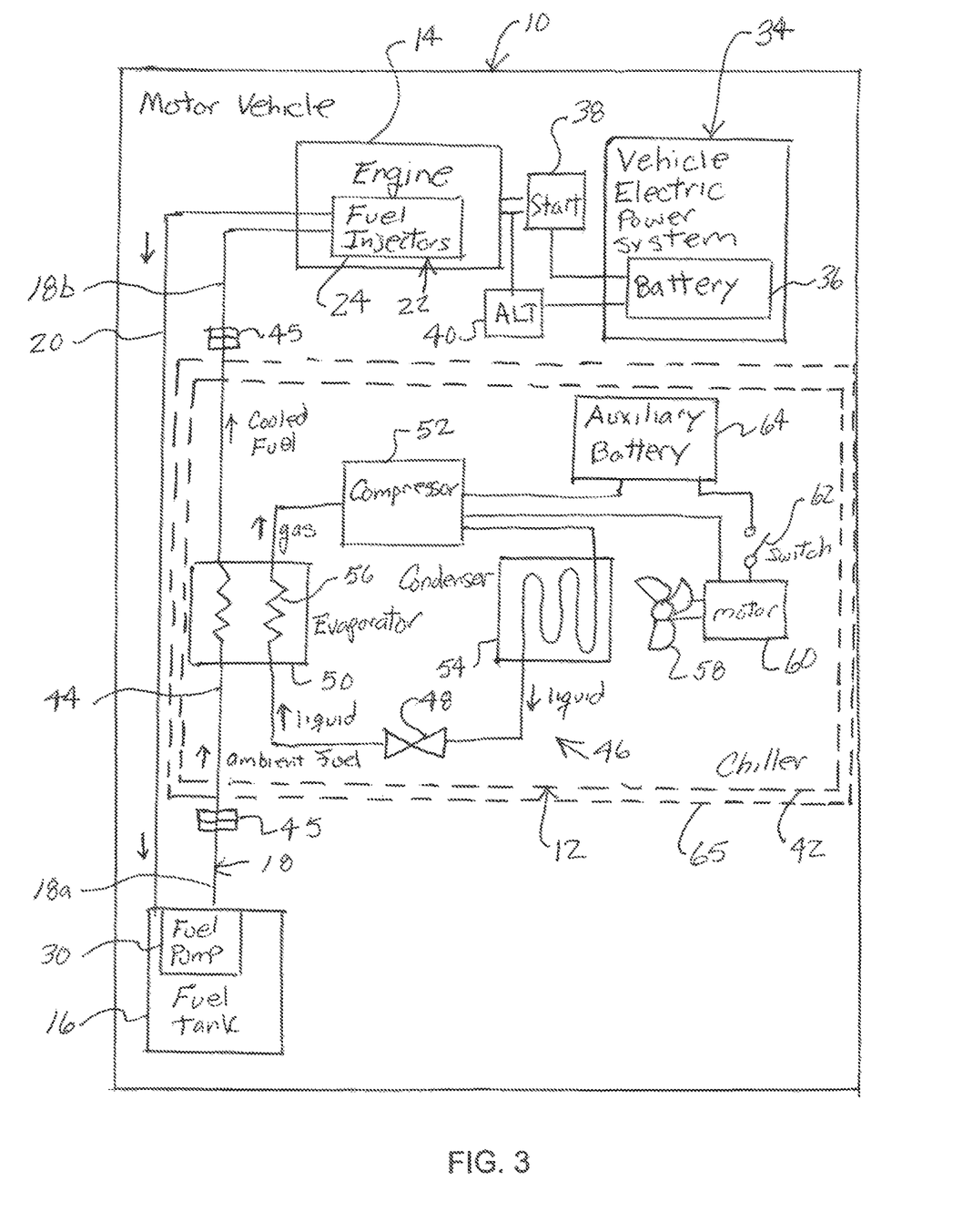
FIG. 3 is a schematic view of the fuel cooling system of FIG. 2 according to a variation of the first embodiment of the present invention wherein an auxiliary battery is provided to power the DC-powered mechanical refrigeration system.

FIG. 3 illustrates an in-line, on-board fuel cooling system 12A for a motor vehicle 10 according to a variation of the above-described first embodiment of the present invention. This variation of the invention is substantially the same as the above-described first embodiment except that an onboard auxiliary battery 64 is provided to power the fuel cooling system 12A. The auxiliary battery 64 illustrates that any other onboard direct-current electric power source can be utilized other than the vehicle electric power system 34 to power the on-board cooling system 12A.

The illustrated auxiliary battery 64 is a rechargeable battery that provides direct current (DC) electric energy. The illustrated auxiliary battery 64 nominally provides 12 volts DC but any other suitable amount can alternatively be utilized such as, for example, 14, 16, 18 and the like volts DC. The illustrated auxiliary battery 36 is operably connected to the compressor 52 and the fan motor 60 to provide all required electric power to the fuel cooling system 12A. That is, the vehicle electric power system 34 is not utilized to provide any electric power to the fuel cooling system 12A. Note that this variation can be particularly advantageous when the fuel cooling system 12 is designed as an aftermarket product to be installed into the motor vehicle 10 because no electrical connection to the motor vehicle 10 is required. Such an aftermarket product can be in the form of a kit including the chiller 42 and the fuel conduit 44 with suitable connections, and with or without the auxiliary battery 64 (which could be provided in the kit or alternatively purchased separately). Such a kit can be designed to be stored in a trunk compartment 65 of the motor vehicle 10 near the fuel tank 16 so that the only connection to the motor vehicle 10 required to install the product would be to connect the fuel conduit 44 along the fuel supply line 18 which can be advantageously near the fuel tank 16. Alternatively, this kit could be designed to be stored in the engine compartment 15, in the trunk compartment 65, or elsewhere for use without the auxiliary battery 64 but two connections to the motor vehicle 10 would be required (between the fuel conduit 44 and the fuel supply line 18, and between the chiller 42 and the vehicle electric power system 34).

Figure 4:
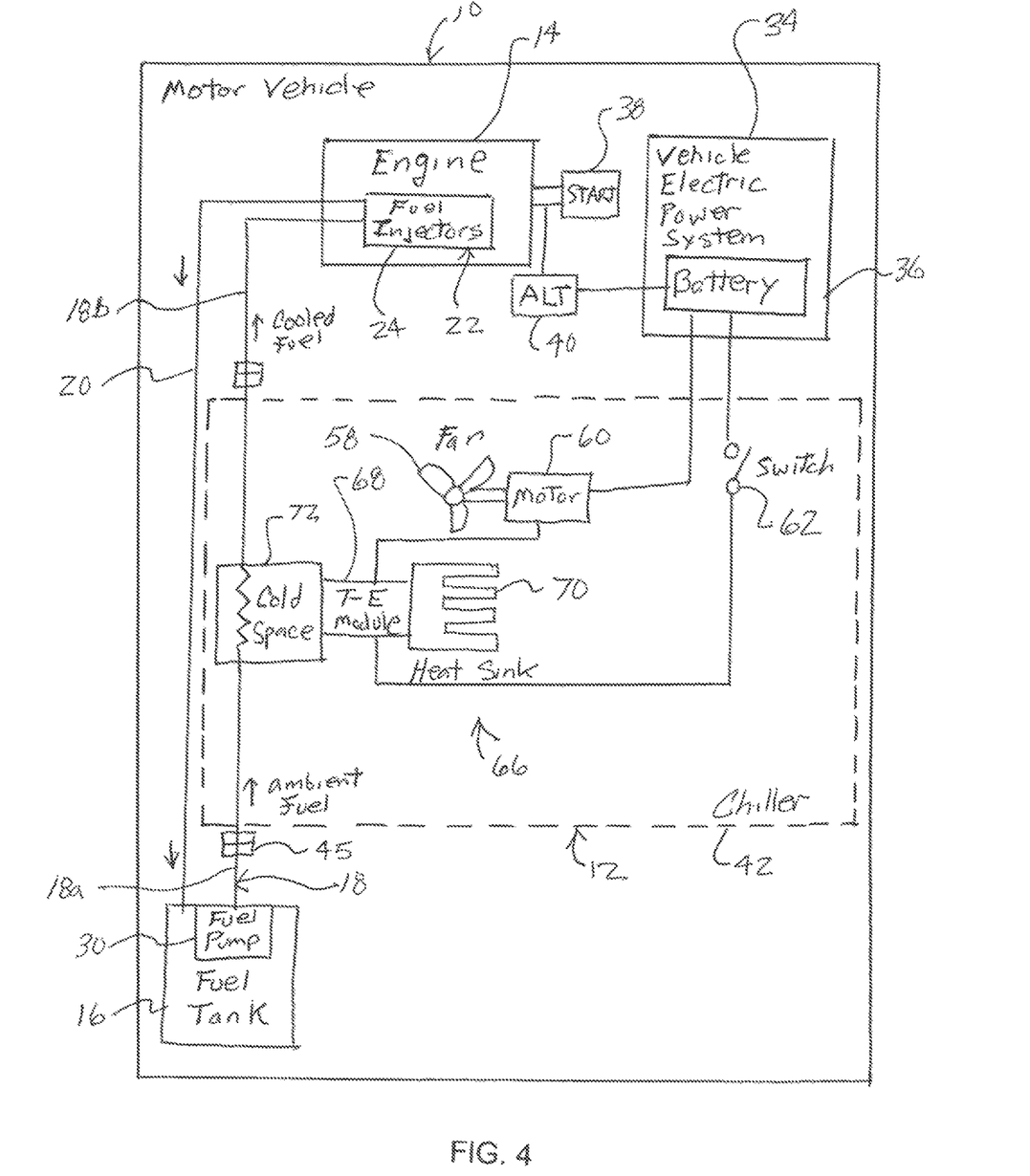
FIG. 4 is a diagrammatic view of a fuel cooling system for a motor vehicle according to a second embodiment of the present invention, wherein the chiller or heat pump is in the form of a DC-powered thermo-electric cooler or refrigerator.

FIG. 4 illustrates an in-line, on-board fuel cooling system 12B for a motor vehicle 10 according to a second embodiment of the present invention. This second embodiment of the present invention is substantially the same as the first embodiment described above except that the chiller or heat pump 42 is a thermo-electric cooler or refrigerator 66 rather than the above-illustrated vapor-compression refrigeration system 46.

The illustrated thermoelectric cooler 68 is a semiconductor-based Peltier-type thermoelectric cooler such that heat is moved from one side to the other when low voltage direct current is applied. The illustrated thermoelectric cooler 68 includes a thermoelectric module 68, a heat sink 70, and a cold space 72. The illustrated thermoelectric module 68 includes pairs of P-type and N-type semiconductor thermo elements form a thermocouple which are electrically coupled in series and thermally connected in parallel. The thermoelectric module 68 is considered to be highly reliable due to its solid state construction. When direct current power is supplied to the thermoelectric module 68, heat is pumped from a first or cold side to an opposed second or hot side. The illustrated thermoelectric module 68 comprises bismuth telluride but any other suitable material or materials can alternatively be utilized. The thermoelectric module 68 can alternatively be of any other suitable type. The illustrated thermoelectric module 68 is powered by the battery 36 of the vehicle electric power system 34 but it is noted that the direct-current electric power source can be of any other suitable type.

The illustrated heat sink 70 is in thermal transfer contact with the hot side of the thermoelectric module 68 in order to expedite the transfer of heat away from the hot side of the thermoelectric module 68. The illustrated heat sink comprises aluminum but any other suitable material or materials can alternatively be utilized. The heat sink 70 can alternatively be of any other suitable type. The illustrated heat sink 70 is provided with the fan or blower 58 which blows air over cooling fins of the heat sink 70. The illustrated fan or blower 58 is driven by the electric motor 60 electrically powered by the battery 36 of the vehicle electric power system 34. The fan 58 can be eliminated if desired.

The illustrated cold space 72 is in thermal transfer contact with the cold side of the thermoelectric module 68 in order to expedite the absorption of heat by the cold side of the thermoelectric module 68. The illustrated fuel conduit 44 passes through the illustrated cold space 72 for passage of the fuel there through on the way from the fuel tank 16 to the fuel delivery system 22 and is in thermal transfer relationship therewith to lower the temperature of the fuel passing therethrough. The inlet and outlet of the fuel conduit 44 are adapted for connection to the first and second portions 18a, 18b of the fuel supply line 18. The illustrated cold space 72 comprises aluminum but any other suitable material or materials can alternatively be utilized. The cold space 72 can alternatively be of any other suitable type and/or the fuel conduit 44 can alternately be directly in thermal transfer contact with the cold side of the thermoelectric module 68.

During operation of the illustrated motor vehicle 10, the fuel pump 30 pushes fuel through the first portion 18a of the fuel supply line 18 from the fuel tank 16 to the fuel inlet of the fuel conduit 44 within the cold space 72 of the Thermoelectric cooler 66. The fuel in the fuel tank 16 will initially be at or near ambient temperature. That is, the temperature of the air surrounding the fuel tank 16. However, if warm or heated fuel is returned to the fuel tank 16 from the fuel delivery system 22 through the fuel return line 20 during operation of the motor vehicle, the temperature of the fuel within the fuel tank 16 may rise above ambient temperature. Within the cold space 72, heat is transferred from the relatively warmer fuel passing through fuel conduit 44 to the cold space 72 that is in heat transfer relationship with the fuel within the fuel conduit 44. Thus, the fuel is cooled to a lower temperature as it passes through the fuel conduit 44. The cooled fuel is pushed out of the fuel outlet of the fuel conduit 44 located within the cold space 72 and passes to the engine fuel delivery system through the second portion 18b of the fuel supply line 18 for operation of the engine 14. Thus, the engine 14 is provided with fuel having a temperature lower than the temperature of the fuel located in the fuel tank 16. The illustrated fuel cooling system 12B is provided with the electric switch 62 to selectively connect and disconnect the thermoelectric module 68 and the fan motor 60 with the battery 36 of the vehicle electric power system 34. The switch 62 can be a manual switch for manual activation by an operator of the motor vehicle 10 or can be an automatic switch which automatically activates the fuel cooling system 12B based on a predetermined condition or conditions of the motor vehicle 10 such as, for example, the engine 14 operating, the fuel pump 30 operating, or the like.

Figure 5:
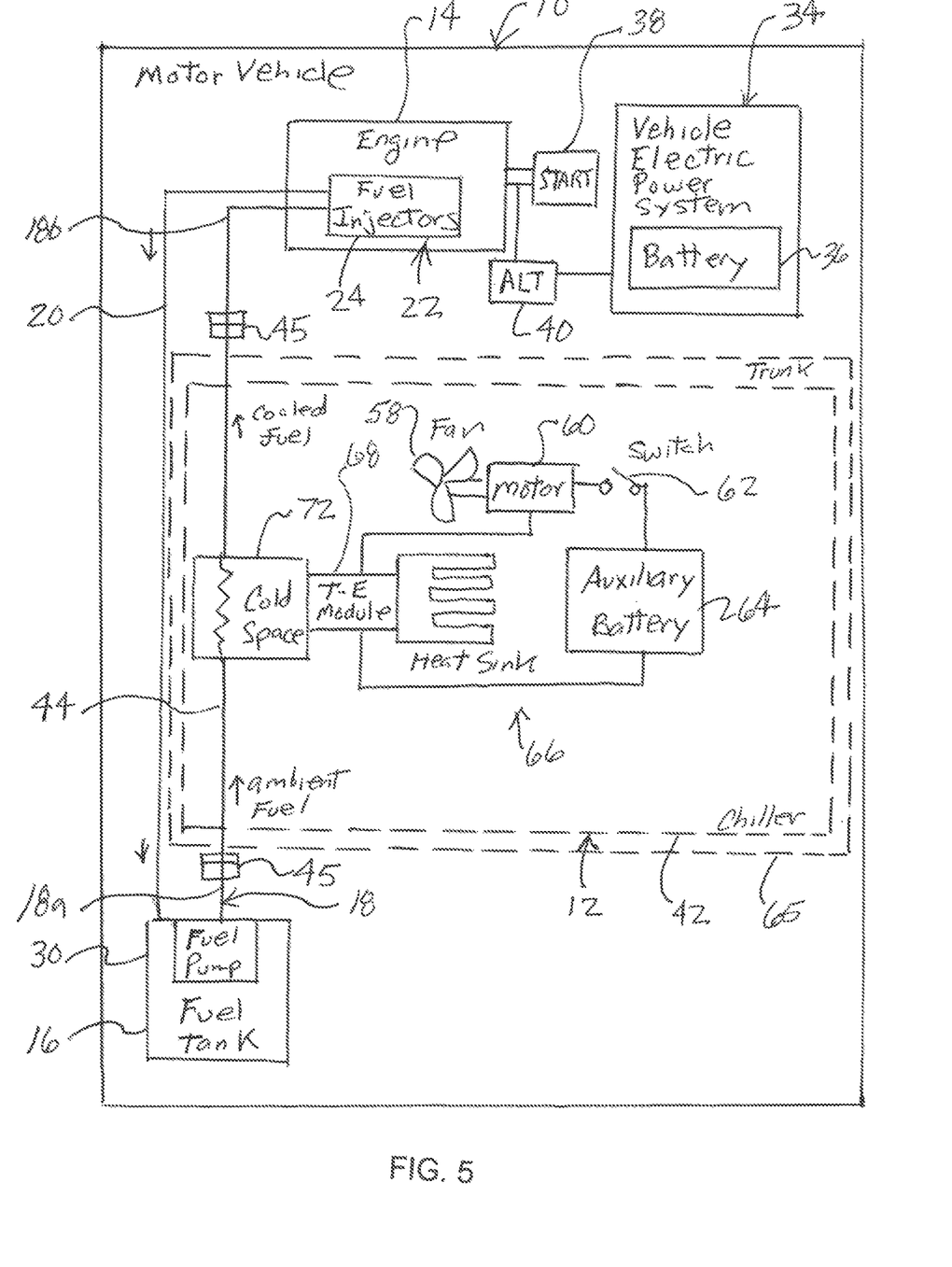
FIG. 5 is a schematic view of the fuel cooling system of FIG. 4 according to a variation of the second embodiment of the present invention wherein an auxiliary battery is provided to power the DC-powered thermo-electric cooler or refrigerator.

FIG. 5 illustrates an in-line, on-board fuel cooling system 12C for a motor vehicle 10 according to a variation of the above-described second embodiment of the present invention. This variation of the invention is substantially the same as the above-described second embodiment except that the auxiliary battery 64 is provided to power the fuel cooling system 12C. The auxiliary battery 64 illustrates that any other onboard direct-current electric power source can be utilized other than the vehicle electric power system 34 to power the on-board cooling system 12C.

The illustrated auxiliary battery 64 is a rechargeable battery that provides direct current (DC) electric energy. The illustrated auxiliary battery 64 nominally provides 12 volts DC but any other suitable amount can alternatively be utilized such as, for example, 14, 16, 18 and the like volts DC. The illustrated auxiliary battery 36 is operably connected to the thermoelectric module 68 and the fan motor 60 to provide all required electric power to the fuel cooling system 12C. That is, the vehicle electric power system 34 is not utilized to provide any electric power to the fuel cooling system 12C. Note that this variation can be particularly advantageous when the fuel cooling system is designed as an aftermarket product to be installed into the motor vehicle 10 because no electrical connection is required. Note that this variation can be particularly advantageous when the fuel cooling system 12 is designed as an aftermarket product to be installed into the motor vehicle 10 because no electrical connection to the motor vehicle 10 is required. Such an aftermarket product can be in the form of a kit including the chiller 42 and the fuel conduit 44 with suitable connections, and with or without the auxiliary battery 64 (which could be provided in the kit or alternatively purchased separately). Such a kit can be designed to be stored in a trunk compartment 65 of the motor vehicle 10 near the fuel tank 16 so that the only connection to the motor vehicle 10 required to install the product would be to connect the fuel conduit 44 along the fuel supply line 18 which can be advantageously near the fuel tank 16. Alternatively, this kit could be designed to be stored in the engine compartment 15, in the trunk compartment 65, or elsewhere for use without the auxiliary battery 64 but two connections to the motor vehicle 10 would be required (between the fuel conduit 44 and the fuel supply line 18, and between the chiller 42 and the vehicle electric power system 34).

Any of the features or attributes of the above described embodiments and variations can be used in combination with any of the other features and attributes of the above described embodiments and variations as desired.

It is apparent from the above detailed description of preferred embodiments of the present invention, that the fuel cooling systems can be provided in a kit form or a module form for easy retrofitting an existing motor vehicle or the fuel cooling systems can be fully integrated with the motor vehicle. It is apparent from the above detailed description of preferred embodiments of the present invention, that the fuel cooling systems according to the present invention provide much improved fuel cooling in that they may cool the fuel to lower temperatures than currently available fuel cooling systems, may cool the fuel for longer periods of time than currently available fuel cooling systems, and/or may be relatively inexpensive to install and/or operate compared to currently available fuel cooling systems.

From the foregoing disclosure and detailed description of certain preferred embodiments, it is also apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. An onboard fuel cooling system for a motor vehicle having a fuel supply line for passage of fuel at least partially from an onboard fuel tank for storing the fuel to an onboard internal-combustion engine powered by the fuel, said onboard fuel cooling system comprising, in combination:
    a chiller adapted to be powered by an onboard direct-current electric power source;
    wherein the chiller is a vapor-compression refrigeration system comprising an evaporator having a fuel conduit through which the fuel flows and a refrigerant conduit through which refrigerant flows and in thermal transfer relation with the fuel conduit, a direct-current powered compressor that receives the refrigerant from the evaporator, and condenser that receives the refrigerant from the direct-current cowered compressor, and wherein the fuel conduit within the evaporator receives the refrigerant from the condenser;
    wherein the vapor-compression refrigeration system is separate distinct from any air-conditioning system of the motor vehicle; and
    wherein the fuel conduit within the evaporator is adapted to form at least a portion of the fuel supply line between the onboard fuel tank and the onboard internal-combustion engine and is in thermal communication with the refrigerant to cool the fuel as it is passing through the fuel conduit from the onboard fuel tank to the onboard internal-combustion engine so that cooled fuel is pushed out of the fuel conduit within the evaporator and passes to the onboard internal-combustion engine.

2. The onboard fuel cooling system according to claim 1, wherein the onboard direct-current electric power source powers the direct current powered compressor.

3. The onboard fuel cooling system according to claim 2, wherein the onboard direct-current electric power source is an auxiliary battery.

4. The onboard fuel cooling system according to claim 3, further comprising an electric-powered cooling fan for cooling the condenser and powered by the auxiliary battery.

5. The onboard fuel cooling system according to claim 1, further comprising an electric-powered cooling fan for cooling the condenser.

6. The onboard fuel cooling system according to claim 1, wherein the evaporator is adapted to be located near the onboard fuel tank.

7. A motor vehicle comprising, in combination:
an onboard fuel tank for storing a liquid fuel;
an onboard internal-combustion engine powered by the liquid fuel;
a fuel supply line for passage of the liquid fuel at least partially from the onboard fuel tank to the onboard internal-combustion engine;
an onboard direct-current electric power source; and
an onboard fuel cooling system comprising:
 a chiller powered by the onboard direct-current electric power source;
 wherein the chiller is a vapor-compression refrigeration system comprising an evaporator having a fuel conduit through which the fuel flows and a refrigerant conduit through which refrigerant flows and in thermal transfer relation with the fuel conduit, a direct-current powered compressor that receives the refrigerant from the evaporator, and condenser that receives the refrigerant from the direct-current powered compressor, and wherein the fuel conduit within the evaporator receives the refrigerant from the condenser;
 wherein the vapor-compression refrigeration system is separate distinct from any air-conditioning system of the motor vehicle; and
 wherein the fuel conduit within the evaporator forms at least portion of the fuel supply line between the onboard fuel tank and the onboard internal-combustion engine and is in thermal communication with the refrigerant to cool the liquid fuel as it is passing through the fuel conduit from the onboard fuel tank to the onboard internal-combustion engine so that cooled fuel is pushed out of the fuel conduit within the evaporator and passes to the onboard internal-combustion engine.

8. The motor vehicle according to claim 7, wherein the direct-current powered compressor of the vapor-compression refrigeration system is adapted to be powered by the onboard direct-current electric power source.

9. The motor vehicle according to claim 7, wherein the onboard direct-current electric power source is a primary electric power system of the motor vehicle.

10. The motor vehicle according to claim 7, wherein the direct-current electric power source is an auxiliary battery.

11. The motor vehicle according to claim 10, further comprising an electric-powered cooling fan for cooling the condenser of the chiller and powered by the auxiliary battery.

12. The motor vehicle according to claim 7, further comprising an electric-powered cooling fan for cooling the condenser.

13. The motor vehicle according to claim 7, wherein the evaporator is located near the onboard fuel tank.

14. A method for cooling fuel onboard a motor vehicle having a fuel supply line for passage of fuel at least partially from an onboard fuel tank for storing the fuel to an onboard internal-combustion engine powered by the fuel, the method comprising the steps of:
 passing the fuel through a fuel conduit adapted to form at least a portion of the fuel supply line between the onboard fuel tank and the onboard internal-combustion engine;
 cooling the fuel passing through the fuel conduit from the onboard fuel tank to the onboard internal combustion engine with an onboard chiller in thermal communication with the fuel conduit;
 wherein the chiller is a vapor-compression refrigeration system comprising an evaporator having the fuel conduit therein through which the fuel flows and a refrigerant conduit through which refrigerant flows and in thermal transfer relation with the fuel conduit, a direct-current powered compressor that receives the refrigerant from the evaporator, and condenser that receives the refrigerant from the direct-current powered compressor, and wherein the fuel conduit within the evaporator receives the refrigerant from the condenser;
 wherein the vapor-compression refrigeration system is separate distinct from any air-conditioning system of the motor vehicle;
 wherein the fuel conduit within the evaporator forms at least portion of the fuel supply line between the onboard fuel tank and the onboard internal-combustion engine and is in thermal communication with the refrigerant to cool the liquid fuel as it is passing through the fuel conduit from the onboard fuel tank to the onboard internal-combustion engine so that cooled fuel is pushed out of the fuel conduit within the evaporator and passes to the onboard internal-combustion engine; and
 powering the direct-current powered compressor of the onboard chiller with an onboard direct-current electric power source.

15. The onboard fuel cooling system according to claim 1, wherein the chiller is adapted to be at least partially located in a trunk compartment of the motor vehicle.

16. The onboard fuel cooling system according to claim 3, wherein the auxiliary battery is adapted to be located in a trunk compartment of the motor vehicle.

17. The motor vehicle according to claim 7, wherein the chiller is at least partially located in a trunk compartment of the motor vehicle.

18. The motor vehicle according to claim 10, wherein the auxiliary battery is adapted to be located in a trunk compartment of the motor vehicle.

19. Method according to claim 14, wherein the chiller is at least partially located in a trunk compartment of the motor vehicle.

20. Method according to claim 14, wherein the evaporator is located near the onboard fuel tank.

* * * * *